(12) United States Patent
Schornstein et al.

(10) Patent No.: US 10,633,482 B2
(45) Date of Patent: Apr. 28, 2020

(54) POLYURETHANE SYSTEMS FOR LAYER STRUCTURES IN WIND TURBINES

(71) Applicant: Covestro Deutschland AG, Leverkusen (DE)

(72) Inventors: Marcel Schornstein, Neuss (DE); Andreas Hoffmann, Pulheim (DE); Dirk Wegener, Monheim (DE); Harald Rasselnberg, Dormagen (DE); Niels Bomholt, Søndersø (DK)

(73) Assignee: COVESTRO DEUTSCHLAND AG, Leverkusen (DE)

( * ) Notice: Subject to any disclaimer, the term of this patent is extended or adjusted under 35 U.S.C. 154(b) by 323 days.

(21) Appl. No.: 15/739,519

(22) PCT Filed: Jun. 22, 2016

(86) PCT No.: PCT/EP2016/064361
§ 371 (c)(1),
(2) Date: Dec. 22, 2017

(87) PCT Pub. No.: WO2016/207191
PCT Pub. Date: Dec. 29, 2016

(65) Prior Publication Data
US 2018/0179323 A1   Jun. 28, 2018

(30) Foreign Application Priority Data
Jun. 24, 2015 (EP) .................................. 15173578

(51) Int. Cl.
| | |
|---|---|
| *C08G 18/48* | (2006.01) |
| *C08G 18/66* | (2006.01) |
| *C08J 5/04* | (2006.01) |
| *C08G 18/76* | (2006.01) |
| *C08G 18/32* | (2006.01) |
| *B29C 70/48* | (2006.01) |
| *B29K 75/00* | (2006.01) |

(52) U.S. Cl.
CPC ..... *C08G 18/4829* (2013.01); *C08G 18/3206* (2013.01); *C08G 18/4825* (2013.01); *C08G 18/6674* (2013.01); *C08G 18/7664* (2013.01); *C08J 5/04* (2013.01); *B29C 70/48* (2013.01); *B29K 2075/00* (2013.01); *B29K 2995/0063* (2013.01); *B29K 2995/0077* (2013.01); *B29K 2995/0082* (2013.01); *C08J 2375/04* (2013.01); *C08J 2375/08* (2013.01)

(58) Field of Classification Search
CPC .................................................. C08B 18/4829
See application file for complete search history.

(56) References Cited

U.S. PATENT DOCUMENTS

2012/0245286 A1   9/2012   Younes

FOREIGN PATENT DOCUMENTS

| WO | 2011069975 A1 | 6/2011 |
| WO | 2013057070 A1 | 4/2013 |

OTHER PUBLICATIONS

Written Opinion of the ISA in WO 2016/207191, WIPO, dated Aug. 2016.*
International Search Report for PCT/EP2016/064361 dated Aug. 26, 2016 (German and English Translation).

* cited by examiner

*Primary Examiner* — Larry W Thrower
(74) *Attorney, Agent, or Firm* — K&L Gates LLP

(57) ABSTRACT

The invention relates to a new polyurethane system which can be advantageously used for the production of large structural components made of fiber composite materials, to the use of said polyurethane reaction system for the production of fiber-reinforced structural components, and to the fiber-reinforced structural components produced using the new polyurethane system.

13 Claims, No Drawings

POLYURETHANE SYSTEMS FOR LAYER STRUCTURES IN WIND TURBINES

CROSS-REFERENCE TO RELATED APPLICATIONS

This application is a U.S. national stage application, filed under 35 U.S.C. § 371, of International Application No. PCT/EP2016/064361, which was filed on Jun. 22, 2016, and which claims priority to European Patent Application No. 15173578.4, which was filed on Jun. 24, 2015, the contents of each are incorporated by reference into this specification.

FIELD

The invention relates to a new polyurethane system which can advantageously be used for the production of large component parts made of fiber-composite materials, to the use of this polyurethane system for producing fiber-reinforced component parts and to the fiber-reinforced component parts produced with the new polyurethane system.

Large component parts made of fiber composite materials (fiber-reinforced component parts) are required, for example, in the wind industry. Energy from wind power is gaining in importance, and wind power plants, in particular the rotor blades and their production, are therefore subject to intensive study and development. The main focus here is on the quality of the produced rotor blades and cost-effective production. Known rotor blades for wind power plants consist of fiber-reinforced plastics based on resins as the matrix material, for example, polyester resins (UP), vinyl ester resins (VE), epoxy resins (EP). The blades are mainly produced such that a lower and an upper half of the wing are each produced in one piece. These two halves are then placed on one another and adhesively bonded. For reinforcement, struts or belts are bonded in as well.

In the production of, the wing halves fiber composite materials, which must cure, are initially produced. This curing process is very time-consuming and disadvantageous for rapid overall fabrication. The rotor blades for wind power plants made of the aforementioned resins are typically produced by hand laminating, hand laminating assisted by prepreg technology, by winding processes or the vacuum-assisted infusion process. For hand laminating a mold is first prepared by applying a release agent and optionally a gel coat to the mold surface. Subsequently, glass NCF's with unidirectional or biaxial orientation are successively placed in the mold. The resin is then applied to the NCF and manually pressed into the NCF by rolling. This step can be repeated as many times as desired. Belts may additionally be incorporated as reinforcing material and other parts, for example lightning protection devices. A so-called spacer layer, generally made of balsa wood, polyvinyl chloride (PVC) or polyurethane (PUR) foam, and a second glass-fiber-reinforced layer analogous to the first, are applied atop the first glass-fiber-reinforced layer. While this method has the advantage that capital costs are low and fault detection and correction are simple, fabrication is excessively labor-intensive, as a result of which the costs of the process are very high and the lengthy fabrication times result in a greater number of faults and high quality assurance costs.

The hand laminating process assisted by prepreg technology is similar to the simple hand laminating process. However, the so-called prepregs (resin-impregnated prefabricated glass mats) are produced outside the mold and then positioned in the rotor blade mold. While the partial automation, as compared to simple hand laminating, performed for fabrication of the prepregs results in improved quality in rotor fabrication the protection of the workers from the volatile compounds present in the liquid resin mixtures requires a not insignificant level of cost and complexity.

In resin injection processes (also as "Resin Transfer Molding" (RTM) or "vacuum assisted resin transfer molding" (VA RTM) or "SCRIMP Process" (Seemann Composites Resin Infusion Molding Process) the molds are prepared by applying a release agent and optionally a gelcoat. The dry fiber mats are then placed into the mold according to a precise fabrication plan. The first inserted layer will later give the outer layer of the rotor blade. The spacer materials are then optionally inserted, whereupon fiber mats are positioned again which then form the inner layer of the finished rotor half/rotor half shell. The entire mold is then hermetically sealed with a vacuum-tight film. From the thus-prepared mold the air is drawn from the fiber mats and spacer materials before the resin is injected into the mold (space between film and mold) at one or at various location(s). This process—similarly to the two mentioned above—has the disadvantage that the necessary curing time to demolding of the component part with conventional materials (UP, VE and EP resins) is very lengthy, up to 12 hours, and the productivity of the plants is therefore very severely limited.

For the production of large moldings, such as are used for rotor blades, it is preferable to use vacuum-assisted infusion processes. Furthermore, the resins used must have a lengthy open pot life and a low viscosity while nevertheless curing quickly at a desired point.

More recent developments are already targeting polyurethane systems which promise the industrial user faster cycle times by faster curing and lower curing temperatures.

In the context of the present application the term "polyurethane system" refers to a mixture comprising reactive components which can polymerize to form urethane groups or refers to mixtures in which reactive components and already partially formed polyurethanes are simultaneously present (i.e. the polyurethane reaction mixture).

In the present application the term "resin" or "polyurethane resin" refers to the fully reacted polyurethane system.

WO 2011/069975 A2 describes the use of a layered structure in the production of rotor blades for wind power plants, wherein the layer construction includes, inter alia, a fiber layer provided with polyurethane. It is disclosed that in particularly preferred embodiments for producing the polyurethane polyols having an OH number of 350 to 500 mg KOH/g, polyols having 90% secondary OH groups and polyether polyols based on propylene oxide are employed. Polyisocyanate mixtures to be used are in particular mixtures of diphenylmethane diisocyanates and polyphenylene-polymethylene polyisocyanates, wherein in recited embodiments the MDI employed has a content of 2,2'-diphenylmethane diisocyanate and 2,4'-diphenylmethane diisocyanate of at least 3% by weight, preferably at least 20% by weight, particularly preferably at least 40% by weight altogether. The NCO content of the polyisocyanate used should preferably exceed 25% by weight, preferably 30% by weight, particularly preferably 31.4% by weight. A preferred functionality of the polyols or the type of starter molecules for the polyol production (hereinafter also referred to as "initiators") are not described.

The polyols used in the examples of WO 2011/069975 A2 have a nominal functionality of 3.0.

In the present application the term "nominal functionality" is used to indicate the average functionality (number of active hydrogen atoms per molecule) of a polyol or a polyol mixture under the assumption that said functionality is identical to the average functionality (number of active hydrogen atoms per molecule) of the initiator(s) used in their preparation.

WO 2012/134878 A2 describes a polyurethane system for producing reinforced composite components. The system shall have a viscosity at 25° C. of less than 600 mPas for at least 30 minutes, a gel time at ambient temperature of more than 80 minutes and a water content of less than 0.06% based on the overall system, and is used to produce composites by the vacuum infusion process.

The polyurethane systems used in the examples contain polyol formulations having a nominal functionality f=2.75-2.80 and contain a proportion of the sum of 2,2'-diphenylmethane diisocyanate (2,2'-MDI) and 2,4'-diphenylmethane diisocyanate (2,4'-MDI) in the polyisocyanate mixture, which is between 1 and 19% by weight. The formulations shall have an initial viscosity of 250 mPa*s-300 mPa*s (see WO 2012/134878 A2, claim 3). Example 2 has a viscosity after 40 minutes of 360 mPa*s (see WO 2012/134878 A2, table 3). The formulations thus do not meet the requirements demanded of such a system, for example for the production of rotor blades and structural components, by the wind energy industry. The employed fiber NCFs having a weight per unit area of in parts >800 g/m² can be infused with the described solution by vacuum infusion only with difficulty and very slowly. Since a viscosity of 300 mPa*s is already attained after 30 minutes the processing/infusion of the resin is hardly possible at this juncture, thus very severely limiting the productivity of the plants through the higher filling times. The need to use of a flow additive in particular points to the problem of poor flowability.

BACKGROUND

WO 2013/057070 A2 discloses a polyisocyanurate-comprising fiber layer obtainable from a system composed of polyisocyanate and polyol having an isocyanate index of 160-600 and trimerization catalysts. The use of the fiber composite components produced therefrom inter alia for producing rotor blades of wind power plants is also described. The disadvantage of this solution is that a high proportion of free isocyanate ("residual NCO") remains in the polyisocyanurate resin which even after curing can react in uncontrolled fashion with atmospheric moisture to form $CO_2$ and can initiate further undesirable aging processes.

EP 0 128 691 A2 discloses the production of an injection-molded polyurethane elastomer from methylene bis(phenyl isocyanates) (MDI) containing more than 10% of the 2,4'-isomer, a polyether containing active hydrogens and an amine-terminated chain extender, wherein more than 50% of the active hydrogens of the polyether originate from primary or secondary amine groups. The required lengthy flowability cannot be achieved in this way.

SUMMARY

As explained in detail above, the prior art does not yet disclose a polyurethane system suitable without limitations for the production of large fiber-reinforced component parts. The hitherto known systems either do not have the required flowability or do not meet the mechanical requirements demanded of the component parts.

Starting from the above-described prior art the problem addressed is that of providing a polyurethane system for producing large fiber-reinforced component parts, for example rotor blades or structural components for the wind industry, which does not have the aforementioned disadvantages and with which the large fiber-reinforced component parts may be cost-effectively produced in a shorter time and with good mechanical properties.

DETAILED DESCRIPTION

Surprisingly, this problem was solved by a polyurethane system for producing a polyurethane resin having a density of >1.050 g/cm³ which is obtainable by the reaction of
  a) a polyisocyanate mixture consisting of one or more polyisocyanates,
  b) a polyol formulation consisting of at least one polyol,
  c) 0-5% by weight, based on the total weight of the polyurethane system, of a catalyst component,
  d) 0-20% by weight, based on the total weight of the polyurethane system, of at least one other compound having at least one isocyanate-reactive group,
  e) 0-20% by weight, based on the total weight of the polyurethane system, of auxiliary and added substances,
wherein
the polyisocyanate mixture a) comprises at least 25% by weight, based on the total weight of a), of 2,2'-diphenylmethane diisocyanate (2,2'-MDI) and/or 2,4'-diphenylmethane diisocyanate (2,4'-MDI) and
the proportion of terminal primary OH functions in the polyol formulation b) is not more than 10%, preferably not more than 5%, particularly preferably not more than 1%, based on the total number of all OH functions in the polyol formulation and
the average (mixed) hydroxyl number of the polyol formulation b) (hereinafter referred to simply as "OH number" or "hydroxyl number") is at least 380 mg KOH/g and
the polyol formulation b) has a nominal functionality of 2.05-2.7,
and
the polyurethane system has an isocyanate ratio of 90-120.

In the context of the present application the term "polyisocyanate" refers to an organic compound containing two or more isocyanate groups (—N=C=O).

The polyisocyanate component contains at least 25% by weight of 2,2'-diphenylmethane diisocyanate (2,2'-MDI) and/or 2,4'-diphenylmethane diisocyanate (2,4'-MDI), preferably at least 30% by weight and especially preferably at least 40% by weight based on the total weight of the polyisocyanate mixture.

It is also possible to use the customary aliphatic, cycloaliphatic, araliphatic di- and/or polyisocyanates and in particular aromatic isocyanates known from polyurethane chemistry. Examples of such suitable polyisocyanates are ethylene diisocyanate, 1,4-butylene diisocyanate, 1,5-pentane diisocyanate, 1,6-hexamethylene diisocyanate (HDI), 1,12-dodecanediisocyanate, cyclobutane-1,3-diisocyanate, cyclohexane-1,4-diisocyanate and mixtures of these isomers, isophorone diisocyanate (IPDI), 2,4- and 2,6-hexahydrotolylene diisocyanate and mixtures of these isomers, 2,2,4- and/or 2,4,4-trimethylhexamethylene diisocyanate, bis(4,4'-, 2,4'- and 2,2'-isocyanatocyclohexyl)methane or mixtures of these isomers,
and aromatic isocyanates of general formula $R(NCO)_z$, wherein R is a polyvalent organic radical comprising an aromatic and z is an integer of at least 2. Examples thereof are 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, 2,4-tolylene diisocyanate, 2,6-tolylene diisocyanate, mixtures of 2,4- and 2,6-tolylene diisocyanate, 1,5-naphthalene diisocyanate, 1-methoxy-2,4-phenylene diisocyanate, 4,4'-diphenylmethane diisocyanate, monomeric MDI and/or higher homologs of the monomeric MDI isomers, 4,4'-biphenylene diisocyanate, 3,3'-dimethyl-4,4'-diphenylmethane diisocyanate, and 3,3'-dimethyldiphenylmethane-4,4'-diisocyanate; triisocyanates, such as 4,4',4"-triphenylmethane triisocyanate and 2,4,6-toluene triisocyanate, and tetraisocyanates such as 4,4'-dimethyl-2,2'-5,5'-diphenylmethane tetraisocyanate and 1,3- and/or 1,4-bis(2-isocyanatoprop-2-yl)benzene (TMXDI), 1,3-bis(isocyanatomethyl)benzene (XDI).

In the context of the present application "monomeric MDI" is to be understood as meaning a polyisocyanate mixture consisting of one or more compounds selected from 4,4'-diphenylmethane diisocyanate, 2,4'-diphenylmethane diisocyanate and 2,2'-diphenylmethane diisocyanate.

In the context of the present application "oligomeric MDI" is to be understood as meaning a polyisocyanate mixture consisting of higher-nuclear homologs of MDI which have at least 3 aromatic nuclei and a functionality of at least 3.

In the context of the present application "polymeric MDI" is used to refer to a mixture consisting of oligomeric MDI and optionally monomeric MDI.

In addition to the abovementioned isocyanates it is also possible to use modified isocyanates, for example isocyanate prepolymers produced with alcohols, in particular with polyetherols or polyesterols, and for example those having a uretdione, isocyanurate, carbodiimide, uretonimine, allophanate or biuret structure.

In addition to the at least 25% by weight of 2,2'-MDI and/or 2,4'-MDI the polyisocyanate component preferably contains 4,4'-MDI or oligomeric MDI or preferably mixtures of at least one oligomer of MDI and at least one of the abovementioned low molecular weight MDI derivatives 2,2'-MDI, 2,4'-MDI or 4,4'-MDI.

Preferred polyisocyanate mixtures a) further include those having a content of monomeric MDI between 50 and 100% by weight, preferably more than 60% by weight and particularly preferably more than 75% by weight. The NCO content of the polyisocyanate used should preferably exceed 25% by weight, preferably 30% by weight, particularly preferably 31.4% by weight.

Particular preference is given to polyisocyanate mixtures consisting of at least 95% by weight, preferably at least 99% by weight, based on the total weight of the polyisocyanate mixture, monomeric MDI and optionally oligomeric MDI. It is in turn preferable when this polyisocyanate mixture consists to an extent of at least 75% by weight, based on the total weight of the polyisocyanate mixture, of mixtures of the diphenylmethane diisocyanates.

The viscosity of the isocyanate should preferably be ≤250 mPas (at 25° C.), preferably of ≤100 mPas (at 25° C.) and particularly preferably of ≤50 mPas (at 25° C.) measured according to DIN 53019-1.

The polyol formulation consists of at least one polyol and is characterized in that the proportion of terminal primary OH functions in the polyol formulation is not more than 10%, preferably less than 5% and particularly preferably less than 1% based on the total number of all OH functions in the polyol formulation b). According to the invention polyether polyols, polyester polyols, polyether ester polyols or polycarbonate polyols may be employed. It is preferable when polyether polyols and/or polyester polyols, particularly preferably polyether polyols, are employed in the polyol formulation.

In addition to the OH function the polyols used in the polyol formulation may also contain other isocyanate-reactive hydrogen atoms (=active hydrogen atoms), for example SH groups, NH groups, $NH_2$ groups and CH-acidic groups. However, even when such further active hydrogen atoms are present, more than 90%, especially more than 95%, particularly more than 99% and very particularly preferably 100% of all isocyanate-reactive hydrogen atoms in the polyol formulation originate from OH functions.

Such polyols are described for example by Ionescu in "Chemistry and Technology of Polyols for Polyurethanes", Rapra Technology Limited, Shawbury 2005, p. 31 et seq. (chapt. 3: The General Characteristics of Oligo-Polyols, p. 55 et seq. (chapt. 4: Oligo-polyols for Elastic Polyurethanes), p. 263 et seq. (chapt. 8: Polyester Polyols for Elastic Polyurethanes) and in particular to p. 321 et seq. (chapt. 13: Polyether Polyols for Rigid Polyurethane Foams) and p. 419 et seq. (chapt. 16: Polyester Polyols for Rigid Polyurethane Foams).

The polyol formulation has a hydroxyl number of >380 mg KOH/g, preferably of 440 to 580 mg KOH/g and particularly preferably of 470 to 520 mg KOH/g.

The polyol formulation has a nominal functionality of 2.05-2.70, preferably of 2.10-2.65.

According to the invention compounds having from 1.8 to 8, in particular 2-8, OH groups are used in particular.

Preferably employed as polyol component b) are one or more polyhydroxyl polyethers which can be produced in a manner known per se by polyaddition of alkylene oxides such as propylene oxide and/or ethylene oxide onto polyfunctional starter compounds in the presence of catalysts. The polyhydroxyl polyethers are preferably produced from a starter compound having on average 2 to 8 active hydrogen atoms and one or more alkylene oxides, for example ethylene oxide, butylene oxide and/or propylene oxide. Preferred starter compounds are molecules having two to eight hydroxyl groups per molecule such as water, ethylene glycol, propylene glycol, diethylene glycol, dipropylene glycol, triethylene glycol, tripropylene glycol, 1,4-butanediol, 1,6-hexanediol, bisphenol A, glycerol, trimethylolpropane, pentaerythritol, sorbitol and sucrose and aminic starter compounds such as ethylenediamine and triethanolamine for example. The starter compounds may be used alone or in admixture. Particular preference is given to 1,2- and 1,3-propylene glycol, diethylene glycol, sorbitol, glycerol, trimethylolpropane, sucrose and mixtures of the recited products. Polyether polyols based on propylene oxide are particularly preferred. Representatives of the recited component b) are described for example in Kunststoff-Handbuch, Vol VII "Polyurethanes", 3rd edition, Carl Hanser Verlag, Munich/Vienna, 1993, pages 57-67 and pages 88-90.

The polyester polyols are polyhydroxyl compounds comprising ester groups, for example, ricinus oil or polyhydroxyl polyesters, such as are obtainable by polycondensation of excess amounts of simple polyhydric alcohols of the type just described by way of example with preferably dibasic carboxylic acids or their anhydrides, for example adipic acid, phthalic acid or phthalic anhydride.

Employable as catalysts c) are for example the known polyurethane catalysts, for example organic metal compounds, such as potassium or sodium salts of organic carboxylic acids, for example, potassium acetate; likewise tin(II) salts of organic carboxylic acids, for example tin(II) acetate, tin(II) octoate, tin(II) ethylhexanoate and tin(II)

laurate, and the dialkyltin(IV) salts of organic carboxylic acids, eg dibutyltin diacetate, dibutyltin dilaurate, dimethyltin dilaurate, dibutyltin maleate and dioctyltin diacetate, and also, for example, diisooctyl-2,2'-[(dioctylstannylene) bis(thio)] diacetate and di-n-butyl-bis(dodecylthio)tin and/or strongly basic amines such as 2,2,2-diazabicyclooctane, N,N-dimethylaminopropylamine, N,N-bis(3-dimethylaminopropyl)-N-isopropanolamine, triethylamine, triethylenediamine, tetramethylhexamethylenediamine, pentamethyldiethylenetriamine, N,N-dimethylcyclohexylamine or bis(N,N-dimethylaminoethyl)ether, N,N-dimethylbenzylamine, N,N-methyldibenzylamine and N-methylimidazole and latent catalysts. Latent catalysts and their mechanism of action are described for example in EP 2531538 A1, pages 1-4 and page 9, lines 26—page 10, line 2. Typical latent catalysts are blocked amine and amidine catalysts, for example catalysts from Air Products (for example Polycat® SA-1/10, Dabco KTM 60) and Tosoh Corporation (such as for instance Toyocat® DB 2, DB 30, DB 31, DB 40, DB 41, DB 42, DB 60, DB 70). Further representatives of catalysts and details concerning the mode of action of the catalysts are described in the Kunststoff-Handbuch, volume VII "Polyurethanes", 3rd edition, Carl Hanser Verlag, Munich/Vienna, 1993 on pages 104-110.

The active catalyst component (exclusive solvent) is used in an amount of 0-5% by weight, preferably of 0.005-4% by weight, especially preferably of 0.008-3% by weight and very particularly preferably of 0.010 to 1% by weight based on the total weight of the polyurethane system.

In a preferred embodiment, thermolatent catalysts are used in an amount (based on the active component excluding solvents) of 0.001-5% by weight, preferably of 0.005-1% by weight, based on the total weight of the polyurethane system.

The polyurethane system may contain 0-20% by weight, preferably 5-15% by weight and in other embodiments 0-5% by weight or 0.5-5% by weight, based on the total weight of the polyurethane system, of further isocyanate-reactive components d) which are distinct from component b) and which are known per se as components for polyurethane Examples are monohydric and polyhydric alcohols or polyethermonools and/or (oxy)alkylenediols, for example ethylene glycol and its oligomers, 1,6-hexanediol, glycerol or trimethylolpropane, polyols comprising dimethylsiloxane units, for example bis(dimethylhydroxymethylsilyl)ethers and dianhydrohexitols; compatibilizers such as methacrylic acid, β-hydroxypropyl esters, maleic and fumaric esters; amines, polyamines and epoxides.

The polyurethane system may preferably contain not only the known reactive components but also further auxiliary and added substances e), for example, metal complexing agents, defoamers, emulsifiers, water-binders and adhesion promoters and also fillers, such as barium sulfate, titanium dioxide, chopped fibers, for example of glass or carbon, or natural fiber- or platelet-shaped minerals, for example wollastonite or muscovite. Further known additives, for example internal release agents, for example fatty-acid-based systems, and added substances may be used as required.

In a preferred embodiment the polyurethane system contains an internal release agent based on fatty acid esters selected from the group consisting of ester group-comprising condensation products each having a number-average molecular weight of 650 to 3000 g/mol, an acid number of less than 5 and a hydroxyl number of 28 to 112 and each having a number-average functionality of 1.0 to 3.0, formed from one or more fatty acids having 10 to 30 carbon atoms, one or more low-molecular-weight aliphatic and/or aromatic di- and/or tricarboxylic acids each having a number-average molecular weight of 50 to 500 g/mol and/or derivatives thereof and one or more mono- or polyhydric alcohols each having a number-average molecular weight up to 500 g/mol and each having a number-average functionality of 1.5 to 6.

In a preferred embodiment the water content of components b) and optionally c)-e) is reduced or removed for example by vacuum methods or by addition of water-binding substances. This has an effect on the density of the resin for example (inhibition of undesired $CO_2$ formation).

To produce the polyurethane resins the polyisocyanates (a) and the isocyanate-reactive components are reacted in amounts such that the isocyanate ratio of the formulation is 90-120, generally 95-115, preferably 100-110, particularly preferably 102 to 108.

The isocyanate ratio (also known as ratio, NCO/OH index or isocyanate index) is to be understood as meaning the quotient of the actually employed amount of substance [mol] of isocyanate groups and the actually employed amount of substance [mol] of isocyanate-reactive groups, multiplied by 100:

Ratio=(moles of isocyanate groups/moles of isocyanate-reactive groups)*100.

An equivalent amount of NCO groups and NCO-reactive hydrogen atoms corresponds to an NCO/OH index of 100.

The polyurethane systems according to the invention have the following properties:
1. an initial viscosity (measured according to DIN 53019-1 at 23° C.) at a time $t_0$=0 min after mixing of the components a)-e)<180 mPa*s,
2. a viscosity (measured according to DIN 53019-1 at 23° C.) at a time $t_1$=40 min after mixing of the components a)-e)<360 mPa*s
3. a gel time tg≥90 min, preferably ≥100 min, particularly preferably ≥110 min.

The polyurethane system reacts to a polyurethane resin having a density of >1.050 $g/cm^3$.

The polyurethane system according to the invention simultaneously meets the requirements for mechanical parameters applicable to certain component parts and applications, for example in the wind industry.

For example, the HDT (heat distortion temperature) according to DIN EN 75-1 is at least 65° C., preferably at least 70° C.

For example, the tensile strength is at least 65 MPa (according to DIN EN ISO 527).

For example, the flexural strength is at least 95 MPa (according to DIN EN ISO 178).

Details of the standards and measuring instruments to be used for measuring the parameters listed in this application are recited below in the Examples section ("Standards and measuring instruments used").

At a time $t_e$≤($T_g$+4 h) the polyurethane systems according to the invention preferably have a conversion $C_e$ based on the NCO groups in the polyisocyanate of at least 95%.

The invention further provides a process for producing a fiber-reinforced component part from a polyurethane resin having a density of >1.050 $g/cm^3$ by means of a vacuum infusion process comprising the steps of:
  i. degassing of the components a) and b) and optionally c)-e)
  ii. mixing of the components a)-e) to afford a polyurethane system, iii. vacuum-assisted infusion of the polyurethane system into a fiber layer
iv. curing and demolding of the component.

Employable fiber layers are preferably random-laid glass fiber plies, glass fiber wovens and NCFs, chopped or ground glass or mineral fibers and fiber mats, fleeces and knits based on polymer, mineral, carbon, glass or aramid fibers and natural fibers such as for example flax, sisal and jute and mixtures thereof, particularly preferably glass fiber mats or glass fiber fleeces.

In a preferred embodiment, the reaction mixture composed of isocyanate component and compounds having at least two isocyanate-reactive hydrogen atoms is infused at a temperature of less than 80° C., preferably between 10° C. and 50° C., particularly preferably between 20° C. and 40° C.

After the filling with reaction mixture, the curing of the polyurethane can be accelerated by heating the mold. In a preferred embodiment, the injected polyurethane system is cured at a temperature between 40° C. and 160° C., preferably between 60° C. and 120° C., particularly preferably between 70° C. and 90° C.

In a particularly preferred embodiment the polyurethane system according to the invention for producing a polyurethane resin having a density of >1.050 g/cm$^3$, consisting of
a) a polyisocyanate mixture consisting of at least 95% by weight, based on the total weight of the polyisocyanate mixture, of monomeric and optionally oligomeric MDI,
b) a polyol formulation consisting of at least one polypropylene-oxide-based polyol,
c) a catalyst component at least containing a thermolatent catalyst in an amount (based on the active component excluding solvents) of 0.001-5% by weight, preferably of 0.005-1% by weight, based on the total weight of the polyurethane system,
d) 0-20% by weight, based on the total weight of the polyurethane system, of at least one other compound having at least one isocyanate-reactive group,
e) >0% to <20% by weight, based on the total weight of the polyurethane system, of auxiliary and added substances, at least containing a metal complexing agent,
characterized in that
the polyisocyanate mixture a) contains at least 25% by weight, based on the total weight of a), of 2,2'-diphenylmethane diisocyanate (2,2'-MDI) and/or 2,4'-diphenylmethane diisocyanate (2,4'-MDI) and
the proportion of terminal primary OH functions in the polyol formulation b) is not more than 10%, based on the total number of all OH functions in b), and
the hydroxyl number of the polyol formulation b) is from 470 to 520 mg KOH/g and
the polyol formulation b) has a nominal functionality of 2.10 to 2.65
and
the polyurethane system has an isocyanate ratio of 102-108.

The invention shall be more particularly elucidated with reference to the examples which follow.

EXAMPLES

To determine the polyurethane resin properties, shaped bodies (sheets) were produced from inventive polyurethane systems and compared with noninventive systems.

The polyol mixture and the isocyanate mixture were each degassed at a pressure of 1 mbar and 25° C. for 2 hours. Subsequently, to produce the reaction mixture both components were intensively mixed in a vacuum by means of a blade stirrer and degassed for a further 10 min at 1 mbar. The reaction mixture was then transferred into a sheet mold having dimensions of 300 mm×200 mm×4 mm and a mold temperature of 40° C. The mold temperature was increased to 80° C. over 30 min. and then kept constant for 3.5 h. Once the mold had cooled to room temperature the finished sheet was demolded.

Test specimens were produced from the sheets for a tensile test according to DIN EN ISO 527, flexural test according to DIN EN ISO 178, heat distortion temperature according to ISO 75-1/75 2004 (method A—upright) and the modulus, strength, elongation and HDT were each determined to these standards.

In addition, the properties of the resin until curing were determined by the gel time and the viscosity profile at 23° C. To this end, the homogenized reaction mixture composed of the polyol mixture and the isocyanate mixture was analyzed on a gel timer (75 g) and on a rheometer.

Standards or Measuring Instruments Used:

Tensile test according to DIN EN ISO 527: Plastics—Determination of tensile properties—Part 1: General principles (ISO 527-1: 2012); German version EN ISO 527-1: 2012

Flexural test according to DIN EN ISO 178: Plastics—Determination of flexural properties (ISO 178: 2010+Amd. 1: 2013); German version EN ISO 178: 2010+A1: 2013

HDT according to ISO 75-1/75 2004 method A (upright)

Density according to DIN EN ISO 1183-1—method A: Plastics method for determining density of non-foamed plastics part 1: Immersion method, method using liquids pycnometer and titration method (ISO 1183-1:2004); German version EN ISO 1183-1:2004

Rheometer: MCR 501 from Anton Paar

Viscosity according to DIN 53019-1:2008-09 (H<<R), (d/dt=100 1/s): d/dt=shear rate, plate-plate measuring system PP 25, measurement in rotation:

Geltimer: Gardco from Paul N. Gardner, Model GT-SHP-220; Determination of gel time: this instrument is used to determine the gel time of the resin. The instrument consists of a stirrer immersed in the reaction mixture and driven by an electric motor. As soon as the maximum torque (the resin is now in a high-viscosity or solid state) specific to this device is reached, the motor stops and the gel time can be read on the device.

Determination of hydroxyl number according to DIN EN ISO 53240,—part 2: Method with catalyst, November 2007 version Example 1: Production of the Polyurethane Sheets 40 g of a polyether polyol having an OH number of 400 mg KOH/g and a nominal functionality of 3 (viscosity at 25° C.: 370 mPa*s; glycerol starter; propylene-oxide-based, trade name Arcol® Polyol 1030—product of Bayer MaterialScience AG), 160 g of a polyether polyol having an OH number of 515 mg KOH/g and a nominal functionality of 2 (viscosity at 25° C.: 55 mPa*s; 1,2-propylene glycol starter; propylene-oxide-based, trade name L 800—product of Bayer MaterialScience AG) and 0.20 g of Toyocat DB40 (thermolatent catalyst/blocked amine from TOSOH Corporation) were mixed and degassed at a pressure of 1 mbar for 2 hours. Simultaneously, 234.6 g of an isocyanate mixture MDI 1 (NCO content 32.9% by weight; prepared from MDI 1806, monomeric MDI from Bayer MaterialScience AG and MDI 44 V 20 L; polymeric MDI from Bayer MaterialScience AG having a 2,2'-MDI content of 0.6% by weight, 2,4'-MDI content of 42.6% by weight) and 0.06 g of acetylacetone were likewise degassed for 2 hours at a pressure of 1 mbar, subsequently added to the polyol formulation and degassed further at 1 mbar for a further 10 min.

The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time of the resin (reaction mixture) and the viscosity profile at 23° C., the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Example 2: Production of the Polyurethane Sheets 57.3 g of a polyether polyol having an OH number of 430 mg KOH/g and a nominal functionality of 4.6 (viscosity at 25° C.: 4900 mPa*s; glycerol (30%)/sorbitol (70%) starter; propylene-oxide-based, trade name Desmophen® S 440—product of Bayer MaterialScience AG), 160 g of a polyether polyol having an OH number of 515 mg KOH/g and a nominal functionality of 2 (viscosity at 25° C.: 55 mPa*s; 1,2-propylene glycol starter; propylene-oxide-based, trade name polyether L 800—product of Bayer MaterialScience AG) and 0.20 g of Toyocat DB40 (thermolatent catalyst/blocked amine from TOSOH Corporation) were mixed and degassed at a pressure of 1 mbar for 2 hours. Simultaneously, 255.1 g of an isocyanate mixture MDI 1 (NCO content 32.9% by weight; prepared from MDI 1806, monomeric MDI from Bayer MaterialScience AG and MDI 44 V 20 L; polymeric MDI from Bayer MaterialScience AG having a 2,2'-MDI content of 0.6% by weight, 2,4'-MDI content of 42.6% by weight) and 0.06 g of acetylacetone were likewise degassed for 2 hours at a pressure of 1 mbar, subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Comparative Example 3: Production of the Polyurethane Sheets 180 g of a polyether polyol having an OH number of 380 mg KOH/g and a nominal functionality of 3 (viscosity at 25° C.: 600 mPa*s; trimethylolpropane starter; propylene-oxide-based, trade name Desmophen® 550 U—product of Bayer MaterialScience AG), 20 g of a polyether polyol having an OH number of 550 mg KOH/g and a nominal functionality of 3 (viscosity at 25° C.: 1800 mPa*s; trimethylolpropane starter; propylene-oxide-based, trade name DE 4011T—product of Bayer MaterialScience AG) were mixed and degassed at a pressure of 1 mbar for 2 hours. Simultaneously, 188.5 g of an isocyanate mixture MDI 2 (NCO content 32.6% by weight, prepared from Desmodur® 60 RE 11 (polymeric MDI from Bayer MaterialScience AG) having a 2,4-MDI content of 23% by weight; 2, 2'-MDI content of 3.0% by weight; a 2-ring MDI content of 85% by weight) and 0.4 g of MC stabilizer (50% solution of phthaloyl chloride in MDI 1806) were likewise degassed for 2 hours at a pressure of 1 mbar, subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Comparative Example 4: Production of the Polyurethane Sheets 200 g of a polyether polyol having an OH number of 515 mg KOH/g and a nominal functionality of 2 (viscosity at 25° C.: 55 mPa*s; 1,2-propylene glycol starter; propylene-oxide-based, trade name Polyether L 800—product of Bayer MaterialScience AG) were degassed at a pressure of 1 mbar for 2 hours. Simultaneously, 244.4 g of an isocyanate mixture MDI 3 (NCO content 32.6% by weight, produced from Desmodur 60 RE 11 (polymeric MDI from Bayer MaterialScience AG) having a 2,4'-MDI content of 23% by weight; 2,2'-MDI content of 3.0% by weight, a 2-ring MDI content of 85% by weight) and 0.06 g of acetylacetone are likewise degassed for 2 hours at a pressure of 1 mbar, subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Comparative Example 5: Production of the Polyurethane Sheets 40 g of a polyether polyol having an OH number of 565 mg KOH/g and a nominal functionality of 3 (viscosity at 20° C.: 1010 mPa*s; glycerol starter; propylene-oxide-based, trade name Desmophen® 30 SC 01—product of Bayer MaterialScience AG), 160 g of a polyether polyol having an OH number of 260 mg KOH/g and a nominal functionality of 2 (viscosity at 25° C.: 70 mPa*s; 1,2-propanediol starter; propylene-oxide-based, trade name Arcol® Polyol 1004—product of Bayer MaterialScience AG) were mixed and degassed at a pressure of 1 mbar for 2 hours. Simultaneously, 154.4 g of an isocyanate mixture MDI 3 (NCO content 32.6% by weight, prepared from Desmodur® 60 RE 11 (polymeric MDI from Bayer MaterialScience AG) having a 2,4-MDI content of 23% by weight; 2,2'-MDI content of 3.0% by weight; a 2-ring MDI content of 85% by weight) and 0.06 g of acetylacetone were likewise degassed for 2 hours at a pressure of 1 mbar, subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Comparative Example 6: Production of the Polyurethane Sheets 20 g of a polyether polyol having an OH number of 565 mg KOH/g and a nominal functionality of 3 (viscosity at 20° C.: 1010 mPa*s; glycerol starter; propylene-oxide-based, trade name Desmophen® 30 SC 01—product of Bayer MaterialScience AG), 180 g of a polyether polyol having an OH number of 515 mg KOH/g and a nominal functionality of 2 (viscosity at 25° C.: 55 mPa*s; 1,2-propylene glycol starter; propylene-oxide-based, trade name polyether L 800—product of Bayer MaterialScience AG) and 0.20 g of Toyocat DB40 (thermolatent catalyst/blocked amine from TOSOH Corporation) were mixed and degassed at a pressure of 1 mbar for 2 hours. Simultaneously, 260.4 g of an isocyanate mixture MDI 4 (NCO content 31.4% by weight, prepared from MDI 44 V 20 L (polymeric MDI from Bayer MaterialScience AG) having a 2,4-MDI content of 3.3% by weight; 2,2'-MDI content of 0.13% by weight) and 0.06 g of acetylacetone were likewise degassed for 2 hours at a pressure of 1 mbar, subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Comparative Example 7: Production of the Polyurethane Sheets 40 g of a polyether polyol having an OH number of 515 mg KOH/g and a nominal functionality of 2 (viscosity at 25° C.: 55 mPa*s; 1,2-propylene glycol starter; propylene-oxide-based, trade name Polyether L 800—product of Bayer MaterialScience AG), 160 g of a polyether polyol having an OH number of 380 mg KOH/g and a nominal functionality of 3 (viscosity at 25° C.: 600 mPa*s; trimethylolpropane starter; propylene-oxide-based, trade name Desmophen® 550 U—product of Bayer MaterialScience AG) were mixed and degassed at a pressure of 1 mbar for 2 hours. Simultaneously, 188.5 g of an isocyanate mixture MDI 5 (NCO content 32.3% by weight, produced from MDI 1806 isocyanate from Bayer MaterialScience AG, MDI 44 V 20 L (polymeric MDI from Bayer MaterialScience AG), Desmodur 60 RE 11 (polymeric MDI from Bayer MaterialScience AG) having a 2,4 MDI content of 23.6% by weight; 2,2'-MDI content of 1.14% by weight) were likewise degassed for 2 hours at a pressure of 1 mbar and subsequently added to the polyol formulation and degassed further at 1 mbar for a further 10 min. The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time and the viscosity profile at 23° C. of the resin (reaction mixture), the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Example 8: Production of the Polyurethane Sheets 60 g of a polyether polyol having an OH number of 400 mg KOH/g and a nominal functionality of 3 (viscosity at 25° C.: 370 mPa*s; glycerol starter; propylene-oxide-based, trade name Arcol® Polyol 1030—product of Bayer MaterialScience AG), 140 g of a polyether polyol having an OH number of 515 mg KOH/g and a nominal functionality of 2 (viscosity at 25° C.: 55 mPa*s; 1,2-propylene glycol starter; propylene-oxide-based, trade name polyether L 800—product of Bayer MaterialScience AG) and 0.30 g of Toyocat DB40 (thermolatent catalyst/blocked amine from TOSOH Corporation) were mixed and degassed at a pressure of 1 mbar for 2 hours. Simultaneously, 231.8 g of an isocyanate mixture MDI 3 (NCO content 32.6% by weight, prepared from Desmodur® 60 RE 11 (polymeric MDI from Bayer MaterialScience AG) having a 2,4-MDI content of 23% by weight; 2,2'-MDI content of 3.0% by weight; a 2-ring MDI content of 85% by weight) and 0.06 g of acetylacetone were likewise degassed for 2 hours at a pressure of 1 mbar, subsequently added to the polyol formulation and degassed further at 1 mbar for a further 10 min.

The thus produced reaction mixture was then transferred into a sheet mold having dimensions of 300 mm×200 mm×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time of the resin (reaction mixture) and the viscosity profile at 23° C., the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

Example 9: Production of the Polyurethane Sheets 15.4 g of a polyether polyol having an OH number of 396 mg KOH/g and a nominal functionality of 6 (viscosity at 25°

C.: 11600 mPa*s; sorbitol starter; propylene-oxide-based, experimental product N 9392), 184.6 g of a polyether polyol having an OH number of 515 mg KOH/g and a nominal functionality of 2 (viscosity at 25° C.: 55 mPa*s; 1,2-propylene glycol starter; propylene-oxide-based, trade name L 800—product of Bayer MaterialScience AG) and 0.20 g of Toyocat DB40 (thermolatent catalyst/blocked amine from TOSOH Corporation) were mixed and degassed at a pressure of 1 mbar for 2 hours. Simultaneously, 241.4 g of an isocyanate mixture MDI 1 (NCO content 32.9% by weight; prepared from MDI 1806, monomeric MDI from Bayer MaterialScience AG and MDI 44 V 20 L; polymeric MDI from Bayer MaterialScience AG having a 2,2'-MDI content of 0.6% by weight, 2,4'-MDI content of 42.6% by weight) and 0.06 g of acetylacetone were likewise degassed for 2 hours at a pressure of 1 mbar, subsequently added to the polyol formulation and degassed further at 1 mbar for a further 10 min.

The thus produced reaction mixture was then transferred into a sheet mold having dimensions of 300×200×4 mm and a mold temperature of 40° C. The mold temperature was raised to 80° C. over 30 min, kept constant for 3.5 h and once the mold had cooled to room temperature the finished sheet was demolded. The mechanical data for the sheet are shown in Table 1. To determine the gel time of the resin (reaction mixture) and the viscosity profile at 23° C., the polyol formulation and the isocyanate blend were weighed in, in the abovementioned ratio, without prior degassing and mixed in the paper beaker for 10 seconds using a wooden baton so that a homogeneous reaction mixture was present. The mixture was transferred into the geltimer/the rheometer.

TABLE 1 polyurethane system

| | | 1 | 2 | 3 (Comp.) | 4 (Comp.) | 5 (Comp.) | 6 (Comp.) | 7 (Comp.) | 8 | 9 |
|---|---|---|---|---|---|---|---|---|---|---|
| polyol | | | | | | | | | | |
| Arcol 1030 | | 20.0 g | | | | | | | 30.0 g | |
| 30SC01 | | | | | | 20.0 g | 10.0 g | | | |
| L 800 | | 80.0 g | 80.0 g | | 100.0 g | | 90.0 g | 20.0 g | 70.0 g | 92.3 g |
| Arcol 1004 | | | | | | 80.0 g | | | | |
| S 440 | | | 28.6 g | | | | | | | |
| PET 550 U | | | | 90.0 g | | | | 80.0 g | | |
| DE 4011 T | | | | 10.0 g | | | | | | |
| N 9392 | | | | | | | | | | 7.7 g |
| Toyocat DB40 | | 0.1 g | 0.1 g | | | | 0.1 g | | 0.15 g | 0.2 g |
| Isocyanate | | | | | | | | | | |
| MDI 1 | | 117.3 g | 127.6 g | | | | | | | 120.7 g |
| MDI 2 | | | | 94.3 g | | | | | | |
| MDI 3 | | | | | 122.3 g | 77.2 g | | | 115.9 g | |
| MDI 4 | | | | | | | 130.2 g | | | |
| MDI 5 | | | | | | | | 94.3 g | | |
| MC stabilizer | | | | 0.2 g | | | | | | |
| acetylacetone | | 0.03 g | 0.03 g | | 0.03 g | 0.03 g | 0.03 g | | 0.03 g | 0.03 g |
| Index (100 NCO/OH) | | 105.0 | 105.0 | 103.4 | 103.4 | 105.0 | 105.0 | 100 | 105 | 105 |
| Polyol OH number | mg KOH/g | 492.0 | 492.6 | 397.0 | 515.0 | 321.0 | 519.7 | 407 | 480.2 | 505.9 |
| Polyol functionality | | 2.16 | 2.60 | 3.00 | 2.00 | 2.35 | 2.11 | 2.75 | 2.25 | 2.24 |
| Content of primary OH groups in polyol | % | <5 | <5 | <5 | <5 | <5 | <5 | 14.4: | <5 | <5 |
| % By weight 2,2'-MDI | % | 0.60: | 0.60: | 3.00: | 3.00: | 3.00: | 0.13: | 1.139: | 3.00: | 0.60: |
| % By weight 2,4'-MDI | % | 42.58: | 42.58: | 23.00: | 23.00: | 23.00: | 3.30: | 23.57: | 23.00: | 42.58: |
| % By weight 2-ring MDI | % | 85.0: | 85.0: | 85.0: | 85.0: | 85.0: | 40.0: | 69.74: | 85.0: | 85.0: |
| Starting viscosity | (mPa * s) | 47 | 52 | 156 | 52 | 53 | 130 | 158 | 53 | 37 |
| Viscosity 40 min. (isothermal 23° C.) | (MPa * s) | 168 | 212 | >1000 | 380 | 208 | 680 | >1000 | 241 | 323 |
| Viscosity 60 min. (isothermal 23° C.) | (MPa * s) | 312 | 380 | >10,000 | 615 | 317 | >1000 | >1000 | 430 | 940 |
| $t_g$ at 23° C. | (min) | 136 | 128 | 64 | 76 | 232 | 81 | 83 | 120 | 110 |

Example 2 shows that it is also possible to use polyether polyols having a nominal functionality >3 in the polyol formulation provided that the content of primary OH groups in the overall polyol formulation b) is <10% and the nominal functionality of the overall polyol formulation b) is in the range of 2.05-2.70.

Example 9 shows that it is also possible to use polyether polyols not based on glycerol as the starter molecule having a nominal functionality >3 in the polyol formulation provided that the content of the primary OH groups in the overall polyol formulation b) is <10% and the nominal functionality of the overall polyol formulation b) is in the range of 2.05 to 2.70.

TABLE 2

Properties of the cured polyurethane resin

| | | 1 | 2 | 3 (Comp.) | 4 (Comp.) | 5 (Comp.) | 6 (Comp.) | 7 (Comp.) | 8 | 9 |
|---|---|---|---|---|---|---|---|---|---|---|
| Flexural test (DIN EN ISO 178) | | | | | | | | | | |
| Modulus | N/mm$^2$ | 3086 | 3032 | 3048 | 3056 | 2482 | 3146 | 3056 | 2981 | 3248 |
| Flexural strength at 3.5% edge fiber elongation | N/mm$^2$ | 99.0 | 97.7 | 92.7 | — | 68.8 | 99.1 | 97.2 | 94.3 | 102.5 |
| Flexural stress at F max. | N/mm$^2$ | 99.9 | 99.5 | 94.1 | 58.9 | 69.3 | 99.9 | 98.7 | 95.1 | 121.48 |
| Bending strain at F max. | % | 3.5 | 3.6 | 3.6 | 3.0 | 3.6 | 3.5 | 3.6 | 3.5 | 5.46 |
| Tensile test (DIN EN ISO 527) | | | | | | | | | | |
| Modulus | MPa | 2939 | 3063 | 2723 | 2811 | 2523 | 3377 | 2806 | 2868 | 3159 |
| Tensile strength at F max. | MPa | 83.5 | 70.7 | 68.5 | 38.7 | 58.3 | 79.3 | 74.5 | 78.8 | 83.6 |
| Tensile elongation at F max. | % | 4.6 | 3.6 | 4.2 | 1.4 | 3.5 | 4.2 | 4.2 | 4.4 | 4.4 |
| Tensile strength at break | MPa | 78.7 | 69.0 | 58.9 | 38.7 | 55.9 | 71.3 | 63.8 | 76.5 | 54.0 |
| Tensile elongation at break | % | 5.3 | 3.9 | 6.4 | 1.4 | 4.0 | 5.5 | 3.7 | 4.8 | 9.0 |
| Density (DIN EN ISO 1183-1) | kg/dm$^3$ | 1.18 | 1.18 | 1.18 | 1.18 | 1.18 | 1.18 | 1.18 | 1.18 | 1.18 |
| HDT A (ISO 75-1/75 2004) | °C. | 72 | 70 | 59 | 59 | 42 | 67 | 62 | 70 | 72 |

Comparative Examples 3 and 7 show that a nominal functionality of the polyol formulation above 2.7 results in a fast viscosity buildup (>1000 mPa*s after 40 min) and that the gel time is markedly reduced, and the resins are therefore not suitable for use in the vacuum infusion process for the production of large component parts.

As is evident in Comparative example 4, a nominal functionality of the polyol formulation below 2.05 results in a low standard for both the mechanical properties (lower tensile elongation/tensile strength) and the thermal stability (HDT) of the cured matrix.

Especially the measured HDT of only 42° C. shows, in comparative example 5, that within the nominal functionality of the polyol formulation of 2.05-2.7, an excessively low OH number (321 mg KOH/g) for the polyol formulation results in a low standard for the mechanical and thermal values of the cured resin. A sum-total content of less than 25% by weight of 2,2'- and 2,4'-MDI in the isocyanate mixture shows, in comparative example 6, that despite a starting viscosity of 130 mPa*s a severe viscosity increase (>1000 mPa*s) of the resin is observed after 60 minutes, which does not allow processing in the vacuum infusion process to produce rotor blades and structural components in the wind industry.

The invention claimed is:

1. A polyurethane system for producing a polyurethane resin having a density of >1.050 g/cm$^3$, comprising:
   a) a polyisocyanate mixture consisting of one or more polyisocyanates;
   b) a polyol formulation consisting of at least one polyol;
   c) 0-5% by weight, based on the total weight of the polyurethane system, of a catalyst component;
   d) 0-20% by weight, based on the total weight of the polyurethane system, of at least one other compound having at least one isocyanate-reactive group;
   e) 0-20% by weight, based on the total weight of the polyurethane system, of auxiliary and added substances;

wherein,
   the polyisocyanate mixture a) contains at least 25% by weight of 2,2'-diphenylmethane diisocyanate (2,2'-MDI) and/or 2,4'-diphenylmethane diisocyanate (2,4'-MDI), based on the total weight of a);
   the proportion of terminal primary OH functions in the polyol formulation b) is not more than 10%, based on the total number of all OH functions in b);
   the hydroxyl number of the polyol formulation b) is at least 380 mg KOH/g;
   the polyol formulation b) has a nominal functionality of 2.05-2.70; and
   the polyurethane system has an isocyanate ratio of 90-120.

2. The polyurethane system as claimed in claim 1, wherein the isocyanate ratio is 95-115.

3. The polyurethane system as claimed in claim 1, wherein the polyisocyanate mixture a) contains at least 75% by weight, based on the total weight of a), of diphenylmethane diisocyanates.

4. The polyurethane system as claimed in claim 1, wherein the polyol formulation b) contains at least one polyether polyol based on propylene oxide.

5. The polyurethane system as claimed in claim 1, wherein the proportion of terminal primary OH functions in the polyol formulation b) is not more than 5%, based on the total number of all OH functions in b).

6. The polyurethane system as claimed in claim 1, wherein the catalyst component c) contains thermolatent catalysts in an amount, based on the active component excluding solvents, of 0.001-5% by weight, based on the total weight of the polyurethane system.

7. A polyurethane resin having a density of >1.050 g/cm$^3$ comprising the polyurethane system as claimed in claim 1.

8. A process for producing a fiber-reinforced component part from a polyurethane resin as claimed in claim 7 through a vacuum infusion process comprising:

i. degassing of the components a) and b);
ii. mixing of the components a)-e) to afford a polyurethane system as claimed in claim 1;
iii. vacuum-assisted infusion of the polyurethane system into a fiber layer; and
iv. curing and demolding of the component.

9. A fiber-reinforced component part produced by the process as recited in claim 8.

10. An article comprising a composite component part comprising the fiber-reinforced component part as claimed in claim 9.

11. The article of claim 10, wherein the composite part is selected from the group consisting of rotor blades of wind power plants, body parts of automobiles, body parts in aircraft construction, component parts for buildings, component parts for road building, and highly stressed structures.

12. The polyurethane system as claimed in claim 1, wherein the proportion of terminal primary OH functions in the polyol formulation b) is not more than 1%, based on the total number of all OH functions in b).

13. The polyurethane system as claimed in claim 1, wherein the catalyst component c) contains thermolatent catalysts in an amount, based on the active component excluding solvents, of 0.005-1% by weight, based on the total weight of the polyurethane system.

* * * * *